United States Patent [19]

Bauer et al.

[11] Patent Number: 4,840,114
[45] Date of Patent: Jun. 20, 1989

[54] AIR OUTLET DEVICE

[75] Inventors: Karl-Heinz Bauer; Gerold Eckert, both of Bad Neustadt, Fed. Rep. of Germany

[73] Assignee: Preh, Elektrofeinmechanische Werke, Jakob Preh, Nachf. GmbH & Co., Fed. Rep. of Germany

[21] Appl. No.: 180,951

[22] Filed: Apr. 13, 1988

[30] Foreign Application Priority Data

Apr. 23, 1987 [DE] Fed. Rep. of Germany ....... 3713591

[51] Int. Cl.$^4$ .............................................. B60H 1/26
[52] U.S. Cl. .......................................... 98/2; 98/41.1; 251/306
[58] Field of Search .................. 98/2, 41.1, 121.2; 251/305, 306, 308

[56] References Cited

U.S. PATENT DOCUMENTS

| | | | |
|---|---|---|---|
| 2,058,996 | 10/1936 | Kollberg | 251/306 |
| 2,817,489 | 12/1957 | Hesmer | 251/305 X |
| 3,990,674 | 11/1976 | Schattenberg | 98/2 |
| 4,281,817 | 8/1981 | Adams et al. | 251/306 X |
| 4,634,094 | 1/1987 | Geiser | 251/308 X |

FOREIGN PATENT DOCUMENTS

| | | | |
|---|---|---|---|
| 180053 | 5/1986 | European Pat. Off. | 98/2 |
| G85359246 | 12/1985 | Fed. Rep. of Germany. | |
| 60-243440 | 12/1985 | Japan | 98/2 |

Primary Examiner—Harold Joyce
Attorney, Agent, or Firm—Wegner & Bretschneider

[57] ABSTRACT

An air outlet device is to grant in its closing position a tight closing free from whistling noises. This is to be achieved by simple means and despite component tolerances. For this purpose longitudinal gaps formed between a closure flap and seat edges before the closing process narrow towards that end of the closure flap which is remote from the actuating part. During the closing movement the closure flap is distorted elastically so that the longitudinal gaps close at first in the sections remote from the actuating part.

10 Claims, 2 Drawing Sheets

AIR OUTLET DEVICE

BACKGROUND OF THE INVENTION

The invention relates to an air outlet device comprising a housing body and an elastically distortable closure flap which is mounted pivotably around a swivelling axis and located near an air passage opening. At the one end section of the closure flap an actuating part is installed, the swivelling axis being situated parallel to and between sealing edges formed at the closure flap, each of them corresponding to one of the air passage opening's seat edge forming, when in a flap position near the closing position, a longitudinal gap together with its corresponding sealing edge.

Such an air outlet device is used in motor vehicles, for example. Its purpose is the regulation of the air flowing into the interior space of the vehicle. In the DE-GM (German Utility Model) No. 85 35 924 a closure flap for such an air outlet device is described.

With such an air outlet device the closure flap should be as airtight as possible when being in the closed position. Inevitable tolerance of the synthetic moulded parts forming the air outlet device hamper a perfect sealing. In addition, a distortion of the plane closure flap can result in leakages. This is especially due to the fact that in most cases the closure flap is driven only at one end of its swivelling axis.

Leakages are not only unfavourable because then the ventilation cannot be stopped completely, but also because the remaining inflow of air might cause whistling noises.

SUMMARY OF THE INVENTION

It is an object of the invention to provide an air outlet device of a type described above by the simple means of a tight sealing of the longitudinal gap despite component tolerances in the closed position.

According to the invention, said object is achieved with an air outlet device as described above in that the longitudinal gap narrows from the end next to the actuating part towards the end remote from the actuating part, so that during the closing process the sealing edge contacts at first the section remote from the actuating part and then the section closer to the actuating part. Thus the distortability of the closure flap is used intentionally in order to improve the sealing in the closure position. During the closing movement the sealing edge contacts the seat edge at first in that section which is remote from the actuating part. From there the contacting process increasingly proceeds to the section next to the actuating part.

Another advantage is the fact that at the beginning of the closing movement the longitudinal gap is still sufficiently wide in order to preclude a whistling noise due to the air stream flowing through.

It is also advantageous that the pressure with which the sealing edge of the closure flap engages the seat edge is practically the same over the entire length of the sealing edge.

Preferably, the closure flap is locked in the closing position. Due to the distortion of the closure flap during the closure the sealing edge is kept by pressure at the seat edge even in the locked position.

When the locked position is released, the closure flap takes without any difficulties such a position that the longitudinal gap forms an opening with a minimum cross section which prevents a whistling of the passing air.

If, due to an aging process, the elastic distortability of the closure flap decreases, the contacting pressure is reduced; nevertheless, the sealing effect is still better than with an equally aged air outlet device of the prior art.

With a preferred embodiment of the invention the narrowing longitudinal gap is formed so that the seat edge inclines towards the closing plane. This seems to be easier to produce than forming the narrowing longitudinal gap by preforming the closure flap in a way that its sealing edge inclines towards the closing plane.

In another advantageous embodiment of the invention the narrowing longitudinal gap is formed by the regulating flap's elastic sealing lip which represents the sealing edge inclining towards the closing plane. In this context the elasticity of the sealing lip supports the intentionally used distortability of the closure flap.

In the following the invention is described in a more detailed way by means of an explanatory and non-limiting example.

DETAILED DESCRIPTION OF THE INVENTION

Figure 1:
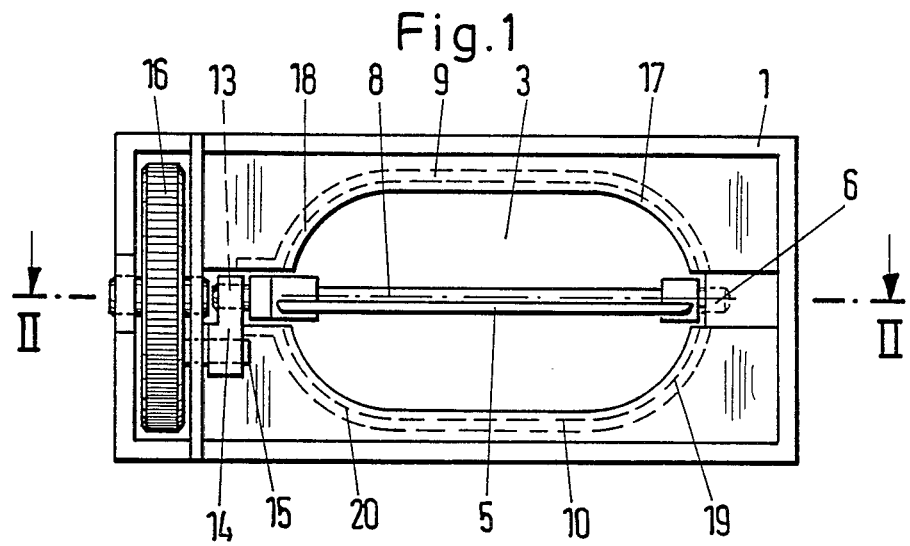
FIG. 1 shows a top view of an air outlet device with opened closure flap.

A housing body 1 forms an air inflow channel 2 with an air passage opening 3 and an air outlet channel 4. In the air passage opening 3 a closure flap 5 is pivoted at bearing points 6, 7 around a swivelling axis 8.

The air passage opening 3 is, on the one hand, defined by an upper seat edge 9 and, on the other hand, by a lower seat edge 10. The two seat edges 9, 10 run approximately parallel to the swivelling axis located centrally between the two seat edges 9, 10.

The closure flap 5 is an elastically distortable synthetic moulded part. It is, on the one hand, provided with a first sealing edge 11 corresponding to the upper seat edge 9 and, on the other hand, with a second sealing edge 12 corresponding to the lower seat edge 10.

At the closure flap 5 an eccentric operating pivot 13 is located. It is coupled with a pin 15 of a wheel-like actuating part 16 by a toggle lever 14. All this is arranged in a way that when the closure flap 5 is in the closed position the toggle lever drive 13, 14, 15 is locked by means of its dead centre.

Figure 2:
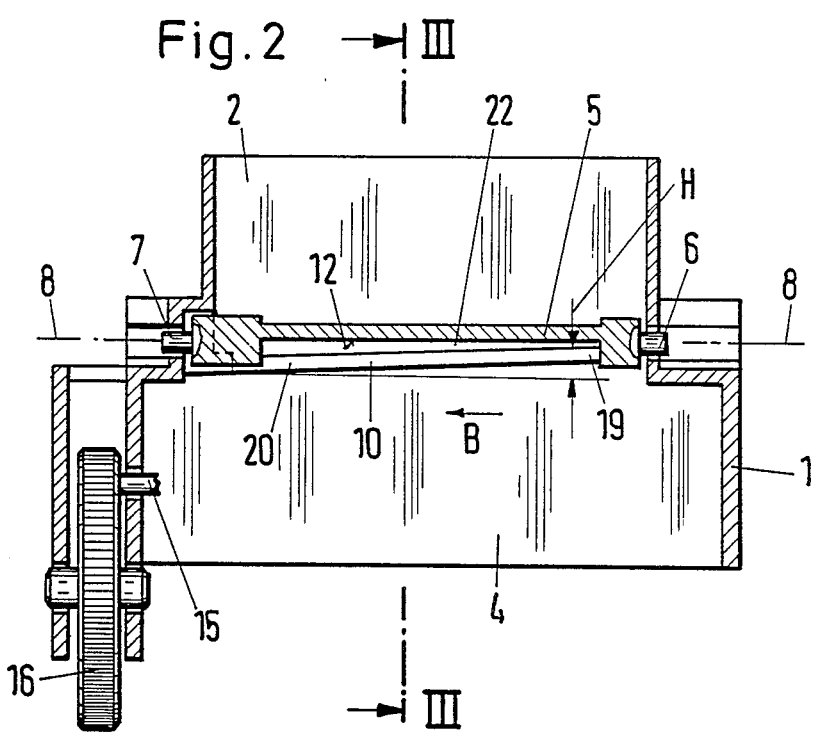
FIG. 2 shows a section along line II—II in FIG. 1, the closure flap being at the beginning of its closing process.

The upper seat edge 9 and the lower seat edge 10 incline both towards the closing plane. Concerning the lower seat edge 10 this is shown in FIG. 2. The upper seat edge 9 has its largest height H in the end section remote from the actuating part 17 and declines towards its end section 18—seen from a view vertical to the drawing plane of FIG. 1. The lower seat edge 10 is arranged correspondingly between its end section 19 remote from the actuating part and its end section 20 next to the actuating part. The difference in height between the end sections 17, 18 and the end sections 19, 20 amounts to 1 mm, for example.

When the closure flap 5 is swivelled from its open position (see FIG. 1) into its closing position, approximately the following happens at the beginning of the closing process (see FIG. 2 and FIG. 3):

The sealing edge 11 contacts the upper seat edge 9 only in that end section 17 which is remote from the actuating part. Between the end section 18 next to the actuating part and the sealing edge 11 there is a distance which corresponds to the difference in height of the seat edge 9. This means that between the sealing edge 11 and the seat edge 9 a longitudinal gap 21 is formed whose width narrows from the end section 18 next to the actuating part towards the end section 17 remote from the actuating part. Consequently, the sealing edge 12 contacts at first only that end section 19 of the seat edge 10 which is remote from the actuating part. There is a distance between the end section 20 remote from the actuating part and the sealing edge 12. Consequently, between seat edge 10 and sealing edge 12 there is a longitudinal gap 22, too, which narrows from the end 20 next to the actuating part towards the end 19 remote from the actuating part 16.

When the actuating part 16 is now moved in such a way that the closure flap 5 swivels further in the direction of arrow A by means of the toggle lever (see FIG. 3), the contacting between the sealing edges 11, 12 and the seat edges 9, 10 increases continuously in the direction of arrow B (see FIG. 2) until the two longitudinal gaps 21, 22 are closed completely. At the end of the closing process the toggle lever drive 13, 14, 15 has been moved beyond its dead point so that the closure flap 5 is now locked in its sealing position. During the closing movement the closure flap 5 is distorted.

Figure 3:
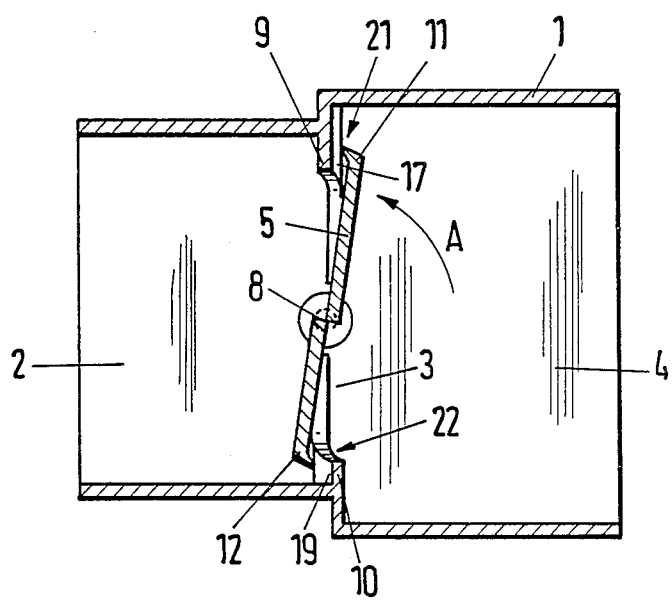
FIG. 3 shows a diagrammatic section along line III—III in FIG. 2, the closure flap being in the same position as in FIG. 2.

In the position shown in FIG. 2 and FIG. 3, at the beginning of the closing movement, the longitudinal gaps 21, 22 are so wide that the air flowing through does not cause a whistling noise. As soon as the opening of the closure flap 5 has been started, the toggle lever 14 returns beyond its dead point. Due to its elasticity the closure flap 5 then takes the position shown in FIG. 2 and FIG. 3. This means that there is no stable position in which whistling noises might occur.

What is claimed is:

1. An air outlet device, comprising:
    a housing body having an air passage opening, said air passage opening defining a closing plane and two seat edges;
    an elastically distortable closure flap which is mounted pivotably around a swivelling axis and located near the air passage opening, said closure flap defining two sealing edges, each sealing edge corresponding to one of the seat edges of the air passage opening, the swivelling axis being situated essentially parallel to and between the sealing edges;
    an actuating part located adjacent to one end of the closure flap, said actuating part being operable so as to pivot the closure flap between an open position, a closed position, and a closing position located between the open position and the closed position;
    wherein when the closure flap is in the closing position, a longitudinal gap is formed between each sealing edge and its corresponding seat edge, said longitudinal gap narrowing from a first end of the closure flap adjacent to the actuating part toward a second end of the closure flap remote from the actuating part so that when the closure flap is moved from the closing position to the closed position, the seat edges progressively contact the sealing edges along the closure flap from the second end to the first end of the closure flap.

2. The air outlet device as claimed in claim 1, wherein said seat edges are inclined relative to said closing plane so as to form said longitudinal gap.

3. The air outlet device as claimed in claim 1 or 2, wherein the closure flap is preformed so that its sealing edges incline toward the closing plane.

4. The air outlet device as claimed in claim 1 or 2, wherein the closure flap further comprises an elastic sealing lip which inclines toward the closing plane.

5. The air outlet device as claimed in claim 1 or 2, further comprising means for locking said closure flap in the closed position.

6. The air outlet device as claimed in claim 5, wherein said locking means comprises a toggle lever which connects the actuating part to the closure flap, said toggle lever having a dead point and being located above its dead point in the closed position.

7. The air outlet device as claimed in claim 3, further comprising means for locking said closure flap in the closed position.

8. The air outlet device as claimed in claim 7, wherein said locking means comprises a toggle lever which connects the actuating part to the closure flap, said toggle lever having a dead point and being located above its dead point in the closed position.

9. The air outlet device as claimed in claim 4, further comprising means for locking said closure flap in the closed position.

10. The air outlet device as claimed in claim 9, wherein said locking means comprises a toggle lever which connects the actuating part to the closure flap, said toggle lever having a dead point and being located above its dead point in the closed position.

* * * * *